G. D. STEVENS.
SLINGS FOR PACKAGES.

No. 181,492. Patented Aug. 22, 1876.

Witnesses.
W. Hauff.
Chas. Wahlers.

Inventor.
Geo. D. Stevens

UNITED STATES PATENT OFFICE.

GEORGE D. STEVENS, OF EAST ORANGE, NEW JERSEY.

IMPROVEMENT IN SLINGS FOR PACKAGES.

Specification forming part of Letters Patent No. 181,492, dated August 22, 1876; application filed February 9, 1876.

*To all whom it may concern:*

Be it known that I, GEORGE D. STEVENS, of East Orange, county of Essex, and State of New Jersey, have invented a new and Improved Sling for Packages, which improvement is fully set forth in the following specification, reference being had to the annexed drawing, in which—

Figure 1:
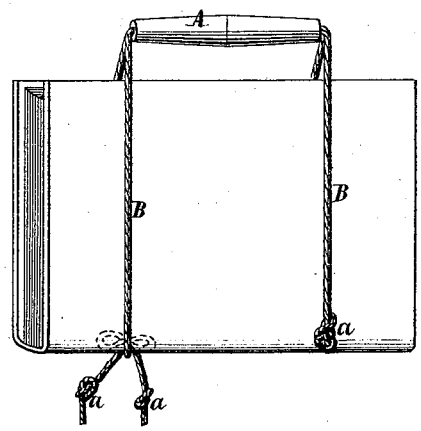
Figure 2:
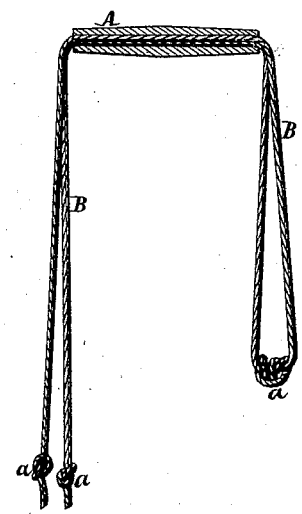

Figure 1 represents a side view of my sling when the same is applied to a package. Fig. 2 is a sectional side view of the same when detached.

Similar letters indicate corresponding parts.

This invention consists in a sling which is composed of a hollow handle and a double cord, which is passed through said handle, and provided at both ends with stops, so that the same is prevented from sliding through the handle, and that, when the ends of the cord are passed round a package and tied, said package can be carried with convenience, the whole being so constructed that an exceedingly simple, cheap, and convenient sling is obtained, which can be readily adapted to packages of any form or shape.

In the drawing, the letter A designates a handle, which is made of wood or any other suitable material, in any convenient form or shape. This handle is bored out throughout its entire length, and through the hole thus produced is passed a double cord, B. This cord may either consist of a single strand doubled up, or two detached pieces of cord may be used. On each side of the handle A the cord B is provided with stops *a a*, produced by tying knots in said cord of sufficient size to prevent the cord from sliding clear through the hollow handle. If a single cord is used, doubled up as above stated, one of the stops is formed in the bight of said cord, while each of the loose ends of said cord is provided with its own stop. If two detached cords are used, each end may be provided with its own stop, or two ends on one side of the handle may be tied together, thereby forming a stop on that side, while the loose ends of the cords are provided each with its own stop. By passing the cord B round a package, and tying the loose ends of said cords together, as shown in Fig. 1, said package can be easily and conveniently carried, the elasticity of the cord permitting sufficient give to allow the hands to grasp the handle without being pinched between the handle and the package. If a doubled-up cord is used, a double-pointed tack may be passed through between the bight of said cord, and secured in the handle, so as to form a stop, and prevent the bight of the cord from being drawn through the handle. A similar tack may be fastened in the opposite end of the handle, so that knots of comparatively small size on the loose ends of the cord will form effective stops.

What I claim as new, and desire to secure by Letters Patent, is—

An improved article of manufacture, a sling for packages, which is composed of a hollow handle and a double cord, provided at its ends with stops, to prevent the same from slipping through the handle, the whole being constructed substantially as shown and described.

In testimony that I claim the foregoing I have hereunto set my hand and seal this 7th day of February, 1876.

GEO. D. STEVENS. [L. S.]

Witnesses:
 W. HAUFF,
 E. F. KASTENHUBER.